W. R. Reece,
Valve Gear.
No. 110,935.   Patented Jan. 10, 1871.
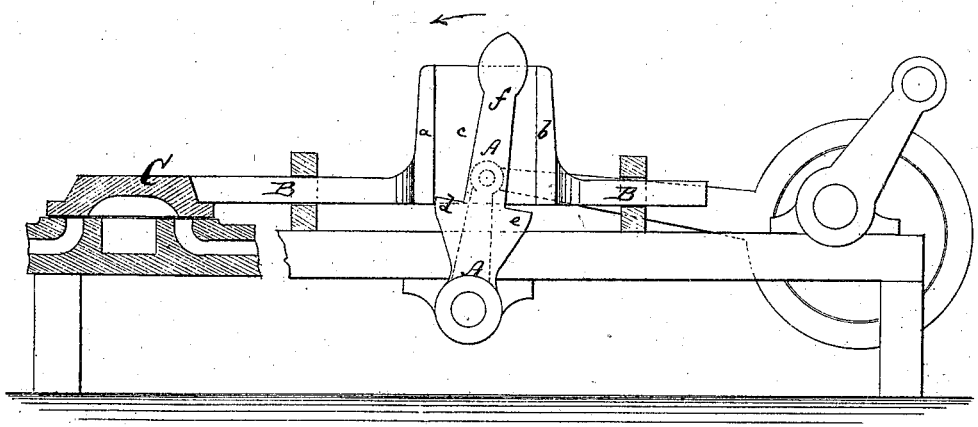
Witnesses.   Inventor:
Chas. Nida   W. R. Reece
L. S. Mabee   per Munn & Co
              Attorneys.

United States Patent Office.

WILLIAM R. REECE, OF TREMONT, PENNSYLVANIA, ASSIGNOR TO HIMSELF AND "THE IRON MANUFACTURING AND COAL COMPANY," OF SAME PLACE.

Letters Patent No. 110,935, dated January 10, 1871.

IMPROVEMENT IN VALVE-GEARS.

The Schedule referred to in these Letters Patent and making part of the same.

*To all whom it may concern:*

Be it known that I, WILLIAM R. REECE, of Tremont, in the county of Schuylkill and State of Pennsylvania, have invented a new and improved Valve-Gear; and I do hereby declare that the following is a full, clear, and exact description thereof, which will enable others skilled in the art to make and use the same, reference being had to the accompanying drawing forming part of this specification.

The drawing represents a side view of my improved valve-gear.

This invention has for its object so to construct the mechanism for operating a slide-valve that the valve will be slowly closed, quickly opened, and allowed to remain stationary a short time when closed, so as to fully utilize the force of the expanding steam.

The invention consists in the use of a three-pointed or T-shaped rock-arm for moving the valve-rod, the said arm, by striking the box ends of the rod with its several points, serving to impart the varying motion, as required.

A in the drawing represents the crank or rack-arm for moving the valve-rod B, with which the slide-valve C, of suitable kind, is connected.

The arm A works between two vertical plates, *a* and *b*, that project from the valve-rod, forming the box *c*, which the rock-arm operates.

The latter is somewhat in shape like an inverted letter T, having two projecting points, *d e*, at its lower part, and a longer shank, *f*, between the same.

When the rod moves in one direction, say that indicated by the arrow, the lower point *d* first strikes the plate *a* and moves the rod and valve slowly until the valve is closed. Then, after the point D has completed its action, the valve remains stationary until the upper end of the shank *f* strikes the plate *a*, when the valve, on account of the quicker motion of the long arm *f*, will be rapidly opened.

During the return stroke of the arm A the point *e* will strike the plate *b* and slowly close the valve, when the shank *f* will, after a short stationary period of the valve, again quickly open the same. The steam is thus allowed full time to enter the cylinder, and also to act expansively within the same, but is rapidly exhausted and the dead center readily overcome.

Having thus described my invention,

I claim as new and desire to secure by Letters Patent—

The rock-arm, having the points *d e* and shank *f*, working between the plates *a b* of the valve-rod to vary the motion of the valve, substantially as herein shown and described.

WILLIAM R. REECE.

Witnesses:
JOSEPH BROWER,
GEO. W. GARRETT.